United States Patent [19]

Gorczynski

[11] Patent Number: 4,650,422
[45] Date of Patent: Mar. 17, 1987

[54] MODULAR FAMILY TREE DOLL SET

[76] Inventor: Dorothy J. Gorczynski, 511 Jefferson Ave., Utica, N.Y. 13501

[21] Appl. No.: 787,507

[22] Filed: Oct. 15, 1985

[51] Int. Cl.[4] .............................................. G09B 19/00
[52] U.S. Cl. ...................................... 434/154; 446/85
[58] Field of Search .................. 434/154; 446/97, 124, 446/85, 268

[56] References Cited

U.S. PATENT DOCUMENTS 4,375,288  3/1983  Guertin ........................... 434/154 X

FOREIGN PATENT DOCUMENTS 1195038  11/1959  France ................................. 434/154

Primary Examiner—Mickey Yu
Attorney, Agent, or Firm—Bruns and Wall

[57] ABSTRACT

A modular family tree doll system has a modular tree formed of a base member, modular trunk sections that snap-fit together, and modular branches that fit to one another and to the trunk sections. Dolls that represent progenitors of either gender back through several generations can be placed in doll swings or treehouses that are suspended from the branches of the tree. Flags can indicate the country of origin for the person that the doll represents, and the doll swings or treehouses, and cushions on the fixed swings or treehouses can be color coded to indicate blood lines. The system can be free standing or can be suspended on a wall, and can be expanded as more is learned about the ancestors.

16 Claims, 13 Drawing Figures

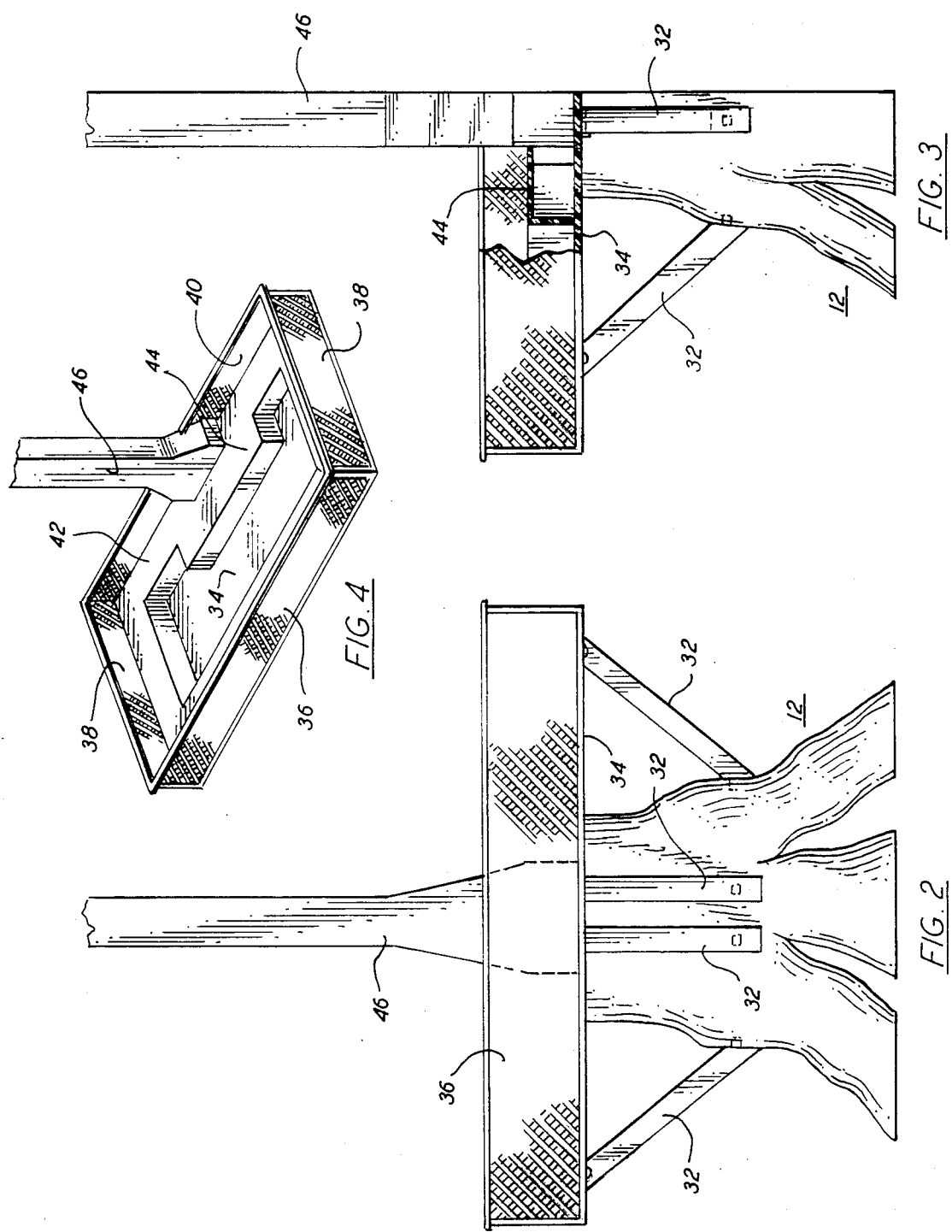

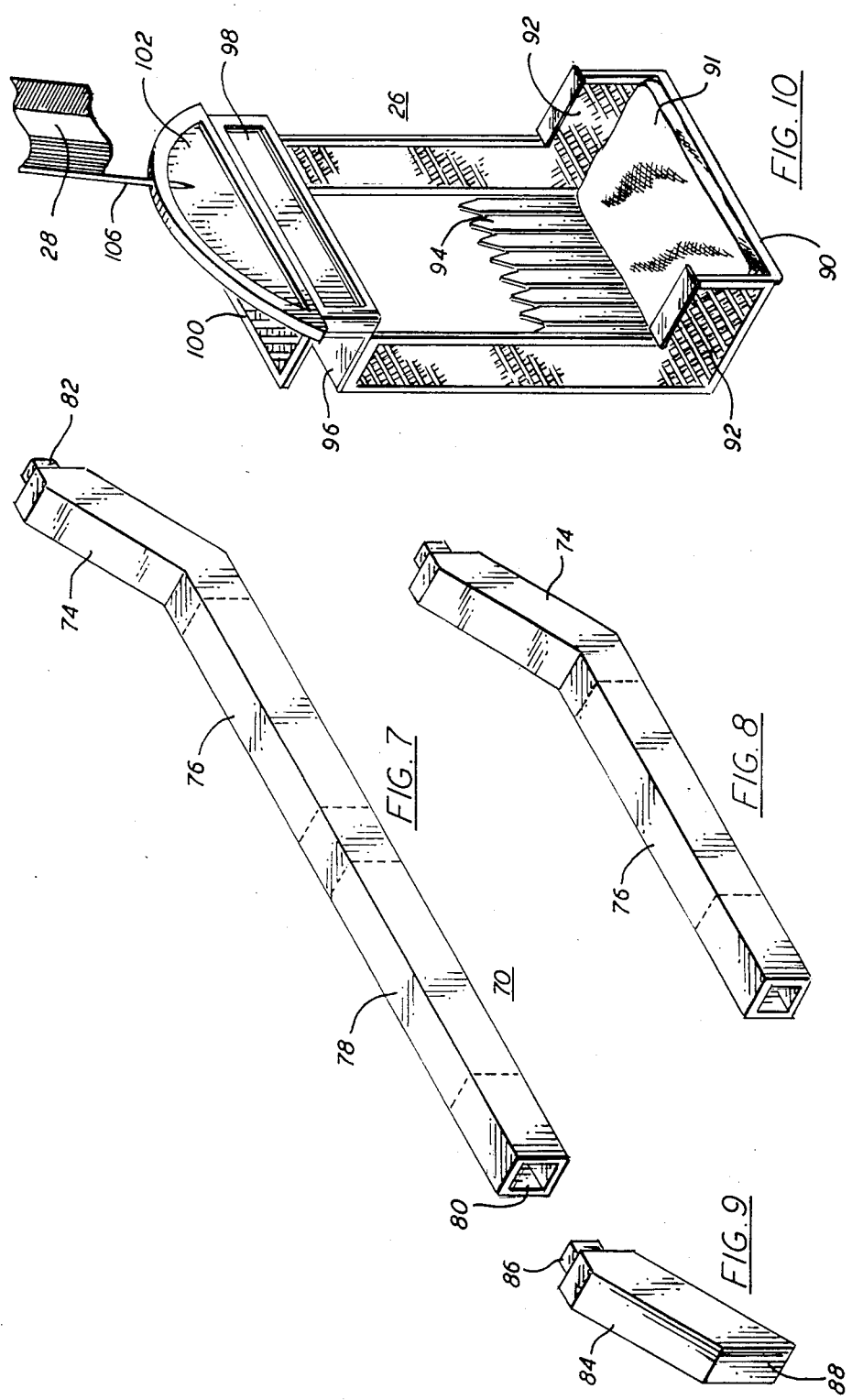

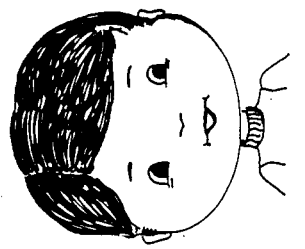
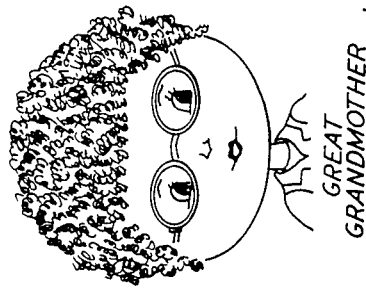
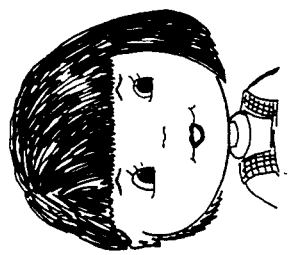
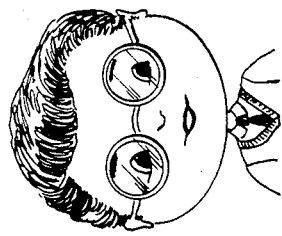
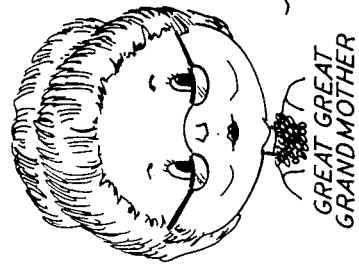
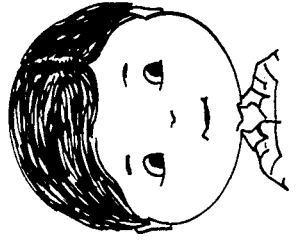
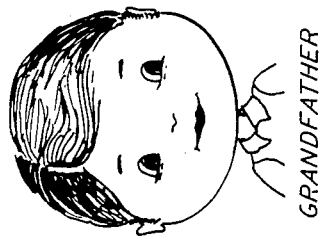
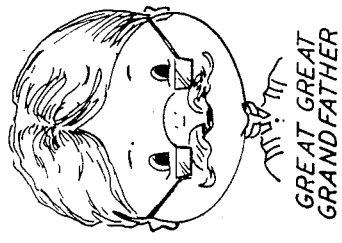
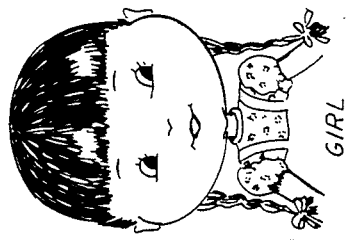
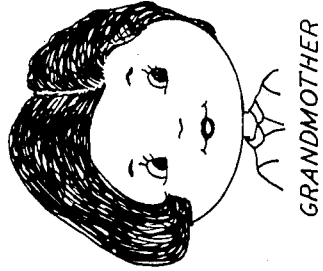
FIG. 13

MODULAR FAMILY TREE DOLL SET

BACKGROUND OF THE INVENTION

This invention is directed to educational toys, and is in particular directed to a modular family tree doll system in which various dolls, suspended in swings or treehouses from various branches of a modular tree structure, represent the ancestors or progenitors of the members of a family unit.

Previous educational devices directed towards genealogy have included card games, charts and the like, but none has been directed to a modular, decorative structure which is educational and can also be used as an ongoing project in which the entire family can participate.

OBJECTS AND SUMMARY OF THE INVENTION

It is an object of this invention to provide a modular family tree structure in which the size of the family tree, and the number of branches, i.e. representing lines of decent or blood lines, can be adapted and tailored to the genealogy of the individual's family.

According to an aspect of this invention, a modular family tree doll system uses dolls to represent progenitors or ancestors of both genders going back for several generations. A tree structure for supporting these dolls comprises a base, a central trunk section that is mountable onto the base and that includes a number of modular trunk members joined to form the trunk section, and a branch structure formed of a plurality of modular branch members which can be connected one to the other and which also can be connected to the modular trunk members. Doll swings or doll treehouses can be suspended from the branch members, and these are dimensioned to hold a desired one or two of the dolls. That is, the doll swings or doll treehouses are placed on the tree branches at positions that represent the relationship of the ancestor represented by the doll to the members of the present family.

To make the structure modular, the modular trunk members are formed with a socket at one end and a protruding tenon at the other end snugly fitting the end socket of an adjacent trunk member. There are branch connector sockets along the length of the trunk members. The branch members also have one or more sockets at the ends and have a protruding tenon at the other end, with the branch tenons snugly fitting into the branch connector sockets of the trunk members and also snugly fitting the sockets of the branch members so that the latter can be joined end-to-end.

The above and many other objects, features, and advantages of this invention will be more fully understood from the following detailed description of a preferred embodiment, when considered in connection with the accompanying drawings.

BRIEF DESCRIPTION OF THE DRAWINGS

FIGS. 2, 3, and 4 are a front elevation, a side elevation and a perspective view of the base and platform of the modular family tree structure.

FIGS. 6, 7, 8, and 9 are isometric views of various branch members which can be used with the embodiment of the invention.

FIG. 10 illustrates one embodiment of a doll swing or doll treehouse that can be suspended from the tree structure of this invention.

FIG. 13 shows an array of various family tree doll heads, for representing family members of both genders over several generations.

DETAILED DESCRIPTION OF THE PREFERRED EMBODIMENT

Figure 1:
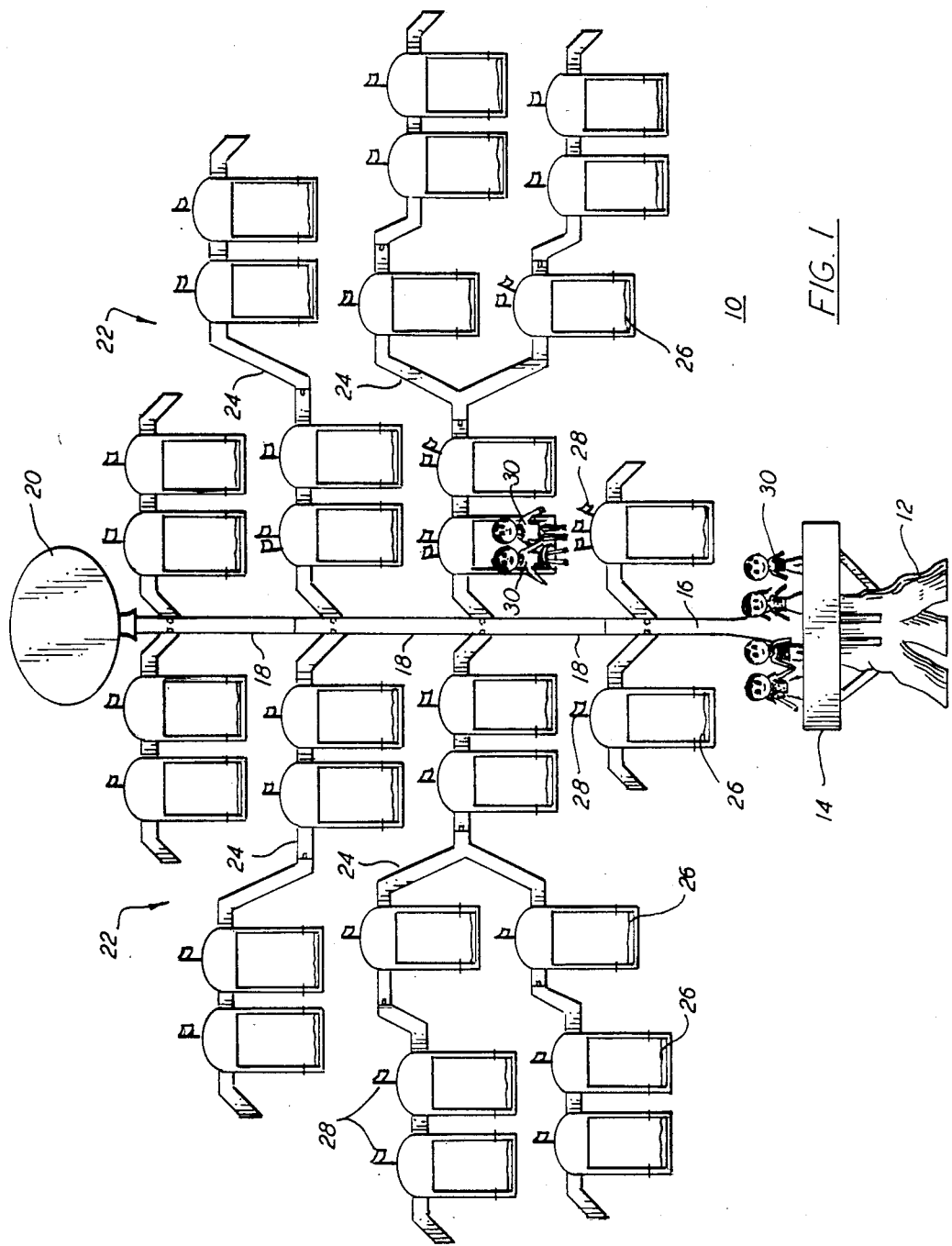
FIG. 1 is an elevational assembly view of the modular family tree structure according to one embodiment of this invention.

The general family tree structure of an embodiment of this invention is illustrated initially with reference to FIG. 1. Here, the structure 10 is formed of a base 12 on which is mounted a trellis platform 14, with a trunk system 16 rising from the base 12. The trunk system 16 is formed of several modular trunk members 18, and has a decorative finial 20 at its top.

The structure also has a branch system 22, formed of a number of individual modular branches 24. On the tree branches 24 are suspended a number of doll treehouses or doll porch swings 26, with each house or swing 26 adapted for holding a doll 30 to represent an individual ancestor or progenitor, such as mother, father, grandmother, grandfather, great-grandmother, great-grandfather, etc. Flags 28 inserted into the tops of these treehouses or swings 26 can indicate the country of origin of the particular ancestor represented by the dolls 30.

As illustrated in FIGS. 2, 3, and 4, the base 12 in this embodiment has a platform 14, which is supported on the base 12 by several diagonal struts 32. The platform 14 has a lower panel 34, a trellis front 36, a pair of trellis sides 38, and a trellis rear 40, with a bench 42 generally surrounding the lower panel 34, and having a dais 44 at the rear about a base trunk member 46.

As is evident from FIG. 3, in this embodiment the structure has a flat rear side, so that the structure 10 can be suspended on a wall and will fit flush against the wall. The base 12 will also support the structure 10 in a free-standing mode, e.g. on a table or the like.

Figure 5:
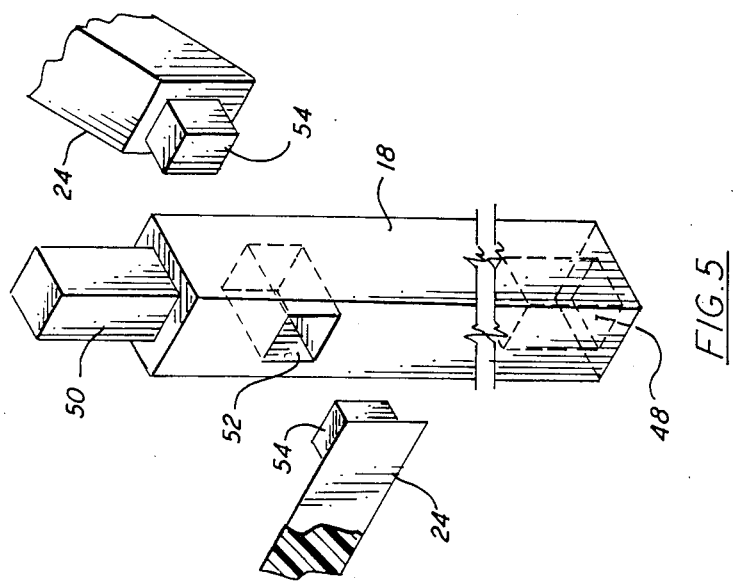
FIG. 5 is an isometric view of a modular trunk member, showing its relationship to a pair of branch members.

The trunk members 18 that are connected end-to-end to the base trunk member 46 have generally the form illustrated in FIG. 5. That is, the trunk members 18 are straight, elongated pieces of square cross-section, each with a square recess or socket 48 at its lower end, and a tenon 50 of square cross-section at its upper end, the tenon 50 fitting snugly into the socket 48 of the next adjacent trunk member 18. The base trunk member 46 has a similar tenon to fit onto the lowermost trunk member 18, while the finial 20 has a socket for fitting onto the tenon 50 of the uppermost trunk member 18.

Each trunk member 18 has a horizontal square cutout or socket 52 extending horizontally through it, for connecting with two opposed branch members 24. To this end, a square protuberance or tenon 54 is provided at the end of each modular branch member 24.

Figure 6:
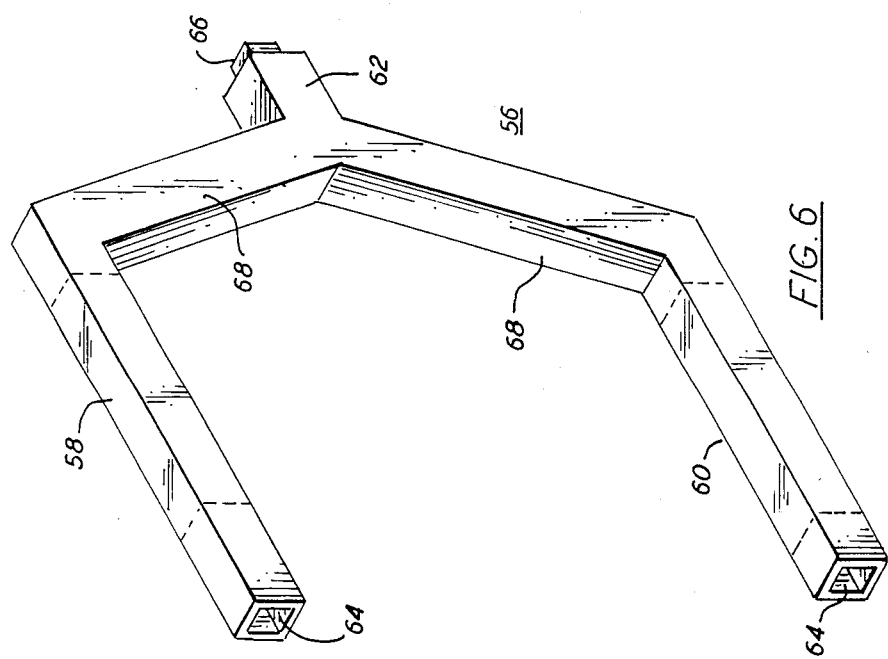

FIG. 6 illustrates a Y-shaped branch member 56 which forks into upper and lower branches 58 and 60 from a stem 62 that faces the trunk members 18. Square cross-section sockets 64 are provided at the end of the upper and lower branches 58 and 60, while a square protuberance or tenon 66 is provided on the stem 62. Angled members 68 join the stem 62 with the upper and lower branches 58, 60. These members 68 can be disposed at a 45 degree angle or at a 60 degree angle (as shown).

An unforked branch 70 is formed of an angle piece 74, and first and second straight pieces 76, 78, each with a socket 80 at one end and a tenon 82 at the other end thereof. The pieces 74, 76, 78 thus snap together by snugly fitting the tenon 82 of one into the socket of the next.

A shorter branch member can be formed, as shown in FIG. 8, by connecting the angle piece 74 with a single straight piece 76.

FIG. 9 shows an end piece 84 angled at a particular predetermined angle, such as 45 degrees or 60 degrees, having a tenon 86, to connect with the socket 80 of another branch member, and having a blank outer end 88.

The trunk members 18 and the modular branch members 56, 74, 76, 78, and 84 can have a textured, bark-like appearance, if desired.

While square cross-section tenons and sockets have been shown here, there is no reason why sockets and tenons of another shape, for example, hexagonal, could not be used. In that case, the modular branch members 74, 76, 78, 84 and 56 could also have a hexagonal cross-section.

The doll treehouse or lattice swing 26 is shown in detail in FIG. 10. Here, a base 90, which can be a platform or seat, has a cushion 91, trellis sides 92 and a back 94, simulating a picket fence. At the top of the sides 92 is a lower horizontal top wall 96, with a lintel 98 rising from it. An upper horizontal top wall 100, parallel to the top wall 96, is spaced from it approximately the width of a branch member 58, 60, 76, or 78. This structure 96, 98, 100 form a recess that mates snugly with the branch member 58, 60, 76, or 78. An arch member 102 is then disposed atop the lintel 98. It should be noted that two of these doll treehouses or doll swings 26 will fit securely side-by-side on the branch member of FIG. 7, while one will fit on the branch member of FIG. 8.

The flag 28 is placed with its stem 106 into a hole or slot provided on the arch 102 to identify the country of national origin of a particular progenitor or ancestor. Here, the red, white, and green in the flag would indicate that the ancestor came from Italy.

The name and dates of the ancestor can be placed on the lintel 98 above the swing or treehouse 26, and other data about the ancestor, such as the traditional family name, place or city of origin, etc. can go on the panel of the arch 102. Names of brothers and sisters of the particular ancestor can be inscribed on the pickets of the back 94.

Figure 11:
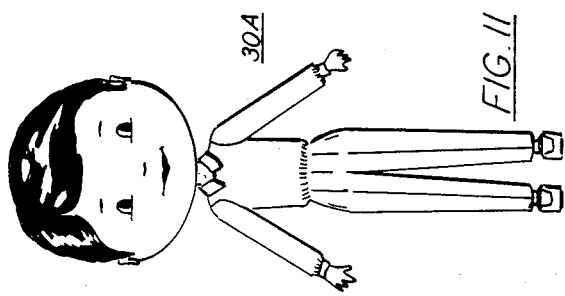
FIGS. 11 and 12 generally show typical male and female family tree dolls.
Figure 12:
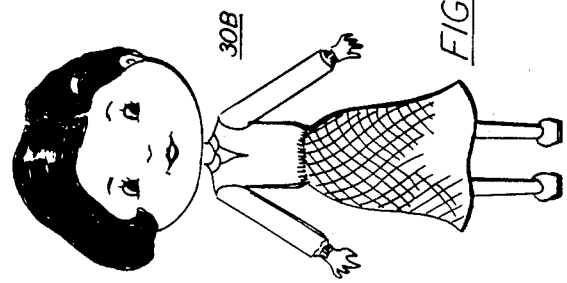

The dolls in the preferred embodiment have the form as generally shown in FIGS. 11 and 12. Here, a male doll 30A can represent a son, father, grandfather, great-grandfather, etc., while a female doll 30B can represent the daughter, mother, grandmother, great-grandmother, etc. Favorably, these dolls 30A and 30B are dimensioned to the scale as shown with respect to the other illustrated parts of the system, so that the doll can be seated in the doll swing or doll treehouse 26 on the cushion 91.

The vest, pants, skirts, blouses, etc. are of optional colors. The seat cushions 91 can be color coded to indicate a particular line of decent or blood line, so that children in the family can follow the line back to a particular ancestor. In several preferred embodiments, the lintels 98 and arches 102 are also color coded for this purpose.

The features of the dolls' heads can be made, for example, as shown in FIG. 13, to represent both genders of various generations, e.g., male and female in first through fifth generations. With this arrangement, the dolls are all of approximately the same general size. By having the facial features vary to indicate generational differences, there is a great deal of flexibility with respect to hair color, skin color, and eye color to match those of the progenitor or ancestor that the doll is to represent.

Other features of this invention are that the lattice-type porch swings 26 or doll treehouses are sufficiently wide to support a pair of dolls, thus indicating that the dolls positioned there may be siblings, first and second spouses (if an ancestor had been widowed, for example). The platform is of sufficient size to seat a number of these dolls 30A, 30B on the seat 42. The platform 14 also finds utility in that it can be used to store stationery or other items.

It should be appreciated that this family tree doll system, being modular, can be expanded, as desired, to accommodate many generations, or can be made of rather modest size to represent only a few generations. This permits the family members to build a complete family treehouse based on their known genealogy, and then build onto the structure as more is learned about their ancestry.

The invention has been described in detail with reference to a preferred embodiment. However, the invention is certainly not limited to that embodiment, and many modifications and variations thereof will present themselves to those skilled in the art without departure from the scope and spirit of the invention, as defined in the appended claims.

I claim:

1. Modular family tree doll set comprising, in combination, a plurality of dolls representing progenitors of both genders and of various generations;

a tree structure comprising a base;

a central trunk section mountable on said base and including a plurality of modular trunk members joined end-to-end to form the trunk section, said modular trunk members each having a socket at one end and a protruding tenon at the other end snugly fitting the end socket of an adjacent trunk member; and having branch connector sockets along their length;

a plurality of modular branch members having sockets at one end thereof and a protruding tenon at the other, the branch tenons fitting snuggly into the branch connector sockets of said trunk members and also snugly fitting into the sockets of said branch members so that the latter can be joined end-to-end; and a plurality of doll treehouses suspendable from said branch members and dimensioned to hold desired ones of said family tree dolls.

2. Modular family tree doll set according to claim 1, wherein said dolls are configured with heads of respective different styles each to represent male and female of first through fifth generations.

3. Modular family tree doll set according to claim 2, wherein said doll treehouses are color coded to identify each of various blood lines.

4. Modular family tree doll set according to claim 1, wherein said trunk member sockets and tenons are of matching regular polygon cross-section.

5. Modular family tree doll set according to claim 1, wherein said trunk member sockets and tenons are of square cross-section.

6. Modular family tree doll set according to claim 1, wherein said branch member sockets and tenons are of matching regular polygon cross-section.

7. Modular family tree doll set according to claim 1, wherein said branch member sockets and tenons are of square cross-section.

8. Modular family tree doll set according to claim 1, wherein said branch members are of generally rectangular cross-section.

9. Modular family tree doll set according to claim 8, wherein said doll treehouses are formed with recess means for snugly fitting over said rectangular cross-section branch members.

10. Modular family tree doll set according to claim 9, wherein the recess means of said doll treehouse includes a lower top wall, an upper top wall spaced therefrom and generally parallel thereto, and a vertical lintel connecting the upper and lower top walls.

11. Modular family tree doll set according to claim 1, wherein said modular branch members include at least one forked member with a single arm with said tenon protruding from one end, a forked portion at the other end of said single arm, and a pair of parallel fingers extending from said forked portion and each having one said branch member socket at a free end thereof.

12. Modular family tree doll set according to claim 1, wherein said modular branch members include at least one non-forked branch member having a section between the branch socket and a mortise that is slanted at an angle of substantially 45 degrees to 60 degrees relative to said its socket and tenon.

13. Modular family tree doll set according to claim 1, wherein each said treehouse includes a platform for seating at least one said doll, sidewalls, a back, and a top, said top including a lintel on which ancestral data, about the progenitor that the doll represents, can be inscribed.

14. Modular family tree doll set according to claim 1, further comprising a plurality of flags to represent nations of origin of the progenitors that said dolls represent, each including a flag staff member, and said treehouses each include opening means for mounting the staff of one or more of said flags.

15. Modular family tree doll set according to claim 1, further comprising a platform mounted on said base and beneath said trunk section, including a surrounding trellis wall and a dais on which one or more of said dolls can be seatedly disposed.

16. Modular family tree doll set according to claim 1, wherein said base, said trunk section, said branch members and said doll treehouses, when assembled, form a structure having a flat rear side such that the structure can be suspended on a wall.

* * * * *